(12) United States Patent
Beauregard

(10) Patent No.: US 9,673,654 B2
(45) Date of Patent: Jun. 6, 2017

(54) MULTI-STAGE QUICK CHARGING SYSTEM

(75) Inventor: François Beauregard, Boucherville (CA)

(73) Assignee: HYDRO-QUÉBEC, Montréal, Québec ( * ) Notice: Subject to any disclaimer, the term of this patent is extended or adjusted under 35 U.S.C. 154(b) by 251 days.

(21) Appl. No.: 14/232,699

(22) PCT Filed: Jul. 12, 2012

(86) PCT No.: PCT/CA2012/050479
§ 371 (c)(1),
(2), (4) Date: Jan. 14, 2014

(87) PCT Pub. No.: WO2013/010270
PCT Pub. Date: Jan. 24, 2013

(65) Prior Publication Data
US 2014/0159650 A1    Jun. 12, 2014

(30) Foreign Application Priority Data

Jul. 15, 2011    (CA) ........................ 2746304
Jul. 29, 2011    (CA) ........................ 2747880

(51) Int. Cl.
*H02J 7/00*    (2006.01)
*H02J 7/04*    (2006.01)
(Continued)

(52) U.S. Cl.
CPC ............. *H02J 7/007* (2013.01); *B60L 7/12* (2013.01); *B60L 11/1805* (2013.01);
(Continued)

(58) Field of Classification Search
USPC ............. 320/103, 104, 107, 108, 118, 137; 307/82, 10.1, 10.7
See application file for complete search history.

(56) References Cited

U.S. PATENT DOCUMENTS

| 6,154,383 A | * | 11/2000 | Cardwell, Jr. ........ H02M 3/337 363/41 |
| 2001/0048606 A1 | | 12/2001 | Mallory |

(Continued)

FOREIGN PATENT DOCUMENTS

| EP | 2 523 301 A1 | 11/2012 |
| JP | H04-281334 | 6/1992 |

(Continued)

OTHER PUBLICATIONS

L.M. Tolbert et al., "Multilevel Converters for Large Electric Drives," IEEE Transactions on Industry Applications, vol. 35, No. 1 Jan./Feb. 1999, pp. 36-44.

(Continued)

*Primary Examiner* — Alexis Pachecho
(74) *Attorney, Agent, or Firm* — Muirhead and Saturnelli, LLC

(57) ABSTRACT

A multi-stage quick charging system is proposed. The system uses an intermediate power battery as voltage supporting point so that a converter having a fraction of the output voltage may control the entire power flow towards or from the battery of a vehicle or an electrical power device. The intermediate battery comprises several stages in series, associated with respective small chargers allowing a management of the charge balancing of the stages of the intermediate battery, since the chargers may be controlled in order to separately vary the contribution of each stage.

19 Claims, 9 Drawing Sheets

(51) Int. Cl.
H02J 7/02 (2016.01)
B60L 7/12 (2006.01)
B60L 11/18 (2006.01)

(52) U.S. Cl.
CPC ......... *B60L 11/185* (2013.01); *B60L 11/1816* (2013.01); *B60L 11/1866* (2013.01); *H02J 7/0024* (2013.01); *H02J 7/0054* (2013.01); *H02J 7/02* (2013.01); *B60L 2200/26* (2013.01); *B60L 2210/10* (2013.01); *B60L 2210/40* (2013.01); *B60L 2240/527* (2013.01); *B60L 2240/529* (2013.01); *Y02T 10/7005* (2013.01); *Y02T 10/7055* (2013.01); *Y02T 10/7061* (2013.01); *Y02T 10/7072* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(56) References Cited

U.S. PATENT DOCUMENTS

| | | | | |
|---|---|---|---|---|
| 2005/0017682 | A1* | 1/2005 | Canter | H02J 7/0021 320/118 |
| 2008/0036419 | A1* | 2/2008 | Cook | H02J 7/0031 320/104 |
| 2009/0237030 | A1* | 9/2009 | Oh | H02J 7/0016 320/108 |
| 2012/0153729 | A1* | 6/2012 | Song | H02J 7/0013 307/82 |
| 2012/0181990 | A1* | 7/2012 | Asakura | B60L 11/1811 320/137 |
| 2012/0242156 | A1* | 9/2012 | Butzmann | H02J 7/0013 307/82 |
| 2012/0299377 | A1* | 11/2012 | Masuda | B60L 11/005 307/10.1 |

FOREIGN PATENT DOCUMENTS

| | | |
|---|---|---|
| JP | H04281334 | 10/1992 |
| JP | H05111171 | 4/1993 |
| JP | H11113185 | 4/1999 |
| JP | 2000-116025 A | 4/2000 |
| JP | 2001-8380 A | 1/2001 |
| JP | 2011-130647 A | 6/2011 |
| WO | WO 2011/078397 A1 | 6/2011 |
| WO | WO 2011/083873 A1 | 7/2011 |

OTHER PUBLICATIONS

S. Allebrod et al., New Transformerless, Scalable Modular Multi-level Converters for HVDC-Transmission Power Electronics Specialists Conference, 2008. PESC 2008. IEEE, pp. 174-179.

A.M. Abbas et al., "A Unified Power Delivery Solution for Integrating DER into Distribution Networks through VSC Based DC System," Power & Energy Society General Meeting, 2009, PES '09, IEEE, 6 pp.

I. Trintis et al., "Single Stage Grid Converters for Battery Energy Storage," Power 5th IET International Conference on Electronics, Machines and Drives (PEMD 2010), Apr. 19-21, 2010, 6 pp.

L. Baruschka et al., "Comparison of Cascaded H-Bridge and Modular Multilevel Converters for BESS Application," Energy Conversion Congress and Exposition (ECCE), 2011 IEEE, Sep. 17-22, 2011, pp. 909-916.

L. Maharjan et al., "Active-Power Control of Individual Converter Cells for a Battery Energy Storage System Based on a Multilevel Cascade PWM Converter," IEEE Transactions on Power Electronics, vol. 27, No. 3, Mar. 2012, pp. 1099-1077.

S. Thomas et al., "Development of a Modular High-Power Converter System for Battery Energy Storage Systems" Power Electronics and Applications (EPE 2011), Proceedings of the 2011—14th European Conference on Aug. 30, 2011-Sep. 1, 2011, 10 pp.

I. Trintis et al., "A New Modular Multilevel Converter with Integrated Energy Storage," IECON 2011—37th Annual Conference on IEEE Industrial Electronics Society, Nov. 7-10, 2011, pp. 1075-1080.

* cited by examiner

MULTI-STAGE QUICK CHARGING SYSTEM

FIELD OF THE INVENTION

The invention generally relates to a charging system, and more particularly to a multi-stage quick charging system with nested converter and internal storage stages.

BACKGROUND

The new advent of power batteries, in particular Li-ion with nanotitanate, exhibiting a very low internal impedance, a very good resistance to deep discharges and a life of thousands of cycles, is conducive to a strong need for quick chargers. It is now possible to charge a vehicle in 5 minutes. For example, buses with a minimal amount of on-board batteries may autonomously run about twenty kilometers and recharge in a few minutes at the terminus.

A problem resides in the economical construction of a charger that may handle the power levels required by such recharging speeds. The power involved is in the order of hundreds of kilowatts and even megawatts in the case of trains and buses.

Not only the charger must handle these power levels, but the connection points compatible with the electrical network are limited or expensive. In the case of a bus station, the power subscribed from the network may be established as function of the peak period (which corresponds to the maximum billable power), but the rest of the time, consumption may be much lower. An extreme case is in a residential application where the charger is intended to be used for some 10 minutes per day to fill up an electric vehicle e.g. at 100 kilowatts.

There is thus a need for a very powerful charger that has an internal storage intended to smooth the power seen by the electrical network.

A classical solution consists in using a small charger that operates over long time periods, preferably during the low energy demand hours, in order to store the energy in a local intermediate battery, also of a power type. When a vehicle is connected for a quick charging, a powerful DC-DC converter is used to transfer a big energy block from the intermediate battery to that of the vehicle. This solution solves the problem of the utilization factor, but always requires a large size converter.

Furthermore, the intermediate battery requires a load balancing system between the various cells and modules that form it. This system adds up to the costs and even possibly to the energy losses of the whole.

Also, the multiplication of chargers with power electronics is likely to impair the quality of the electric wave of the network. The harmonics and interferences generated by chopped waveforms are the main responsible ones. The standards on the apparatuses of that type may only evolve by tightening the electromagnetic emission criteria. There is thus a need for improvement of the current waveform quality of such chargers.

For this purpose, the unitary power factor power converters with sinusoidal pulse width modulation (sinusoidal PWM or SPWM) form a technically attractive solution although high modulation frequencies must be used, which causes switching losses. A multi-level voltage variant allows reducing the switching frequency while preserving the waveform quality. However, the supply and holding of continuous voltages having several levels on the DC side cause control and/or complexity problems.

Finally, there is a growing demand for network-connected apparatuses to be capable of providing assistance to the network in certain circumstances. Be it for power smoothing (i.e. contributing to some extent to provide power during peak periods), voltage support by reactive power supply or even harmonic filtering. Thus, a charger that would satisfy these needs is an advantage.

SUMMARY

An object of the invention is to provide a multi-stage quick charging system with nested intermediary storage and energy transfer stages.

Another object of the invention is to provide such a quick charging system which may be very powerful and that may smooth the power seen from the electrical network.

Another object of the invention is to provide such a quick charging system which may use a reduced-size converter.

Another object of the invention is to provide such a quick charging system which may allow improving the current waveform quality of such types of systems or chargers.

Another object of the invention is to provide such a quick charging system which may be used as a network-connected apparatus capable of providing assistance to the network in certain circumstances.

According to an aspect of the invention, there is provided a multi-stage quick charging system for exchanging energy with an electrical power device, the quick charging system comprising:
  terminals for connection with the electrical power device;
  a number n of converter stages and a number m of energy internal storage stages connected in series between the terminals, with n≥1, m≥0 and n+m≥2, each converter stage having a power converter coupled to an arrangement comprising at least one of an intermediate power battery module and a connection to an electrical supply source, each energy internal storage stage having an intermediate power battery module, each intermediate power battery module being characterized by a high no-load voltage with respect to voltage drops caused by internal impedances of the intermediate power battery module, the intermediate power battery module of each energy internal storage stage and the power converter of each converter stage being connected together in order to be in condition to exchange energy with the electrical power device; and
  a control unit controlling a contribution of each converter stage and, when applicable, of each energy internal storage stage for exchanging energy with the electrical power device.

In a non-limitative manner, the quick charging system according to the invention may be used for the quick charging of electric vehicles including cars, buses, trains, subways, tramways and trolleybuses. It may be used in public charging stations (service stations) or residential ones. It may be used for the local storage for regenerative braking of subway or DC train entering in station. It may play a role for the assistance of the electrical supply network for the load management, the peak load smoothing and the compensation of reactive power or the harmonics. It may allow the integrated management of the balancing of battery cells.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

Figure 2:
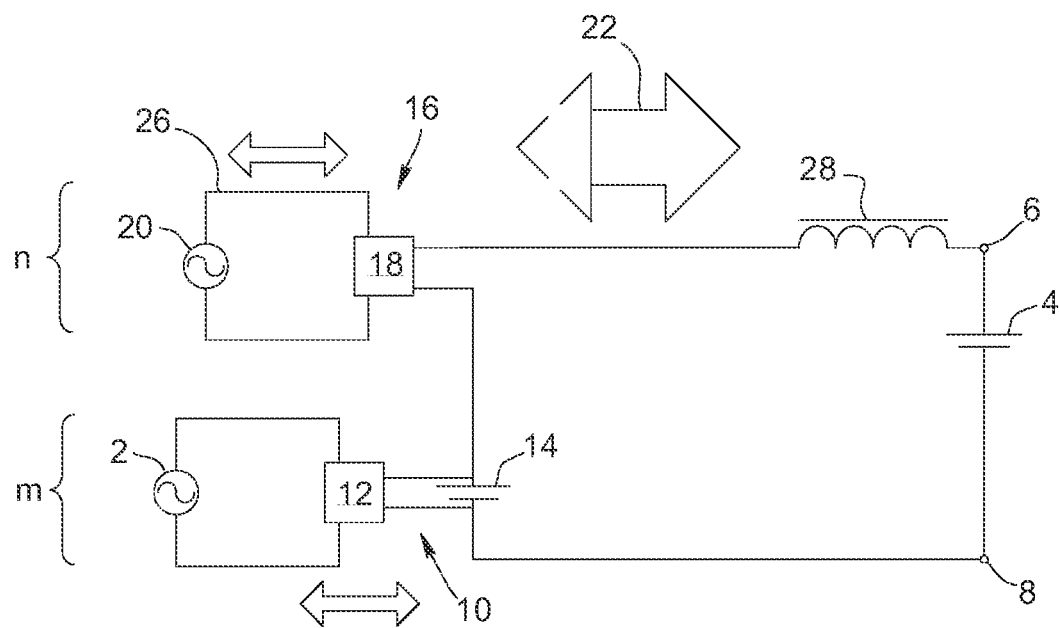
FIG. 2 is a schematic diagram showing the use of an intermediate power battery allowing a control of a large power flow with only a small converter, a slow charger allowing in the long run maintaining the charge of the intermediate power battery.

Referring to FIG. 2, there is shown a multi-stage quick charging system for exchanging energy with an electrical power device 4 such as a power battery of an electric vehicle in the case illustrated in FIG. 2. The quick charging system has terminals 6, 8 for connection with the electrical power device 4. A number n of converter stages 16 and a number m of energy internal storage stages 10 are connected in series between the terminals 6, 8, with n≥1, m≥0 and n+m≥2. Each converter stage 16 has a power converter 18 coupled to an arrangement having an intermediate power battery module 14 (as shown e.g. in FIG. 18) and/or a connection 26 to an electrical supply source 20 connected or not to an electrical network 2 in the case illustrated in FIG. 2. Each energy internal storage stage 10 has an intermediate power battery module 14. Each intermediate power battery module 14 is characterized by a high no-load voltage with respect to voltage drops caused by internal impedances (not shown) of the intermediate power battery module 14. By being so characterized, the intermediate power battery modules 14 allow reducing the voltage rating of the converter stages 16 (which serve for continuous adjustment) or their number, which allows reducing the costs. The intermediate power battery module 14 of each energy internal storage stage 10 and the power converter 18 of each converter stage 16 are connected together so as to be in condition to exchange energy with the electrical power device 4. A control unit 38 (shown in FIG. 11) controls a contribution of each converter stage 16 and, when applicable, of each energy internal storage stage 10 for exchanging energy with the electrical power device 4.

Figure 15:
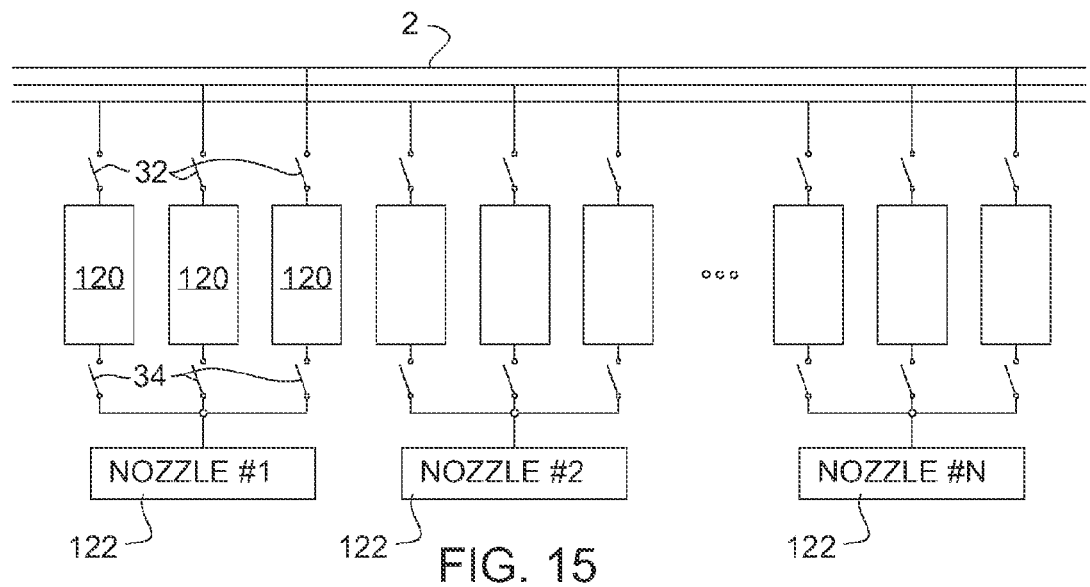
FIG. 15 is a schematic diagram showing an example of an arrangement of several chargers to form a service station.
Figure 16:
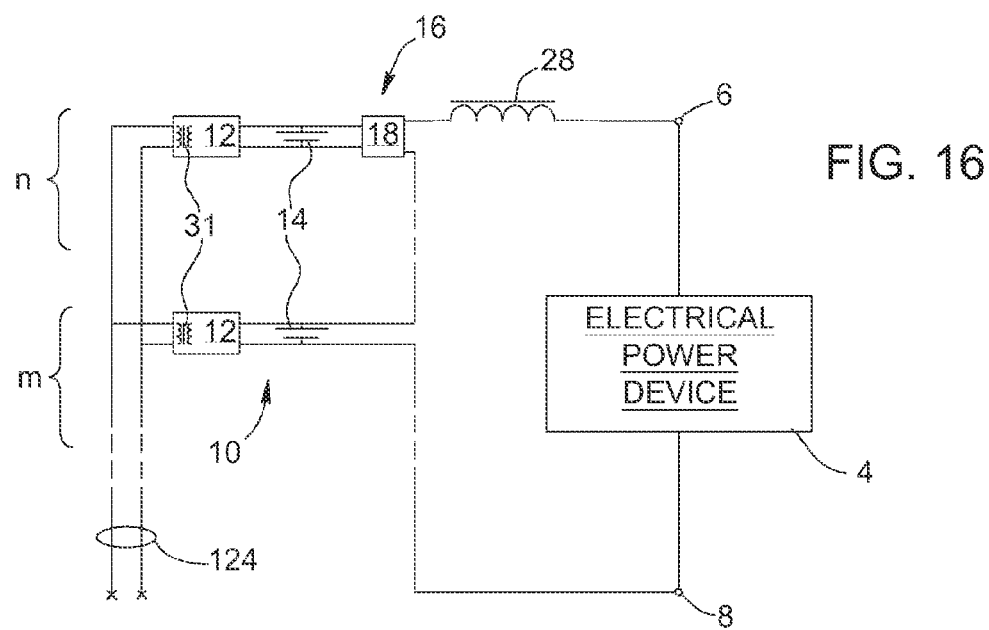
FIG. 16 is a schematic diagram showing an embodiment of the quick charging system with chargers linked by a parallel bus.
Figure 17:
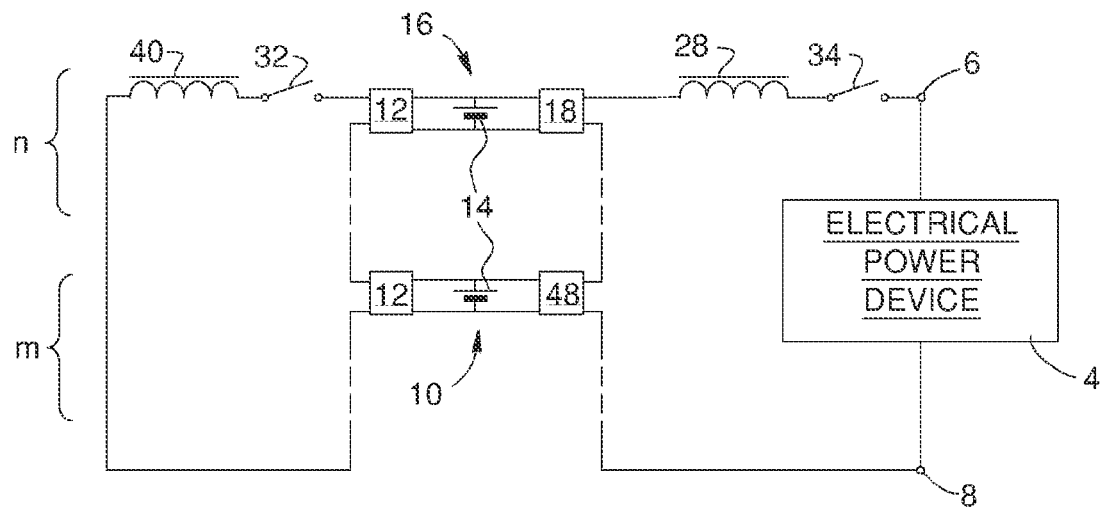
FIG. 17 is a schematic diagram showing an embodiment of the quick charging system with chargers linked by a series loop.
Figure 18:
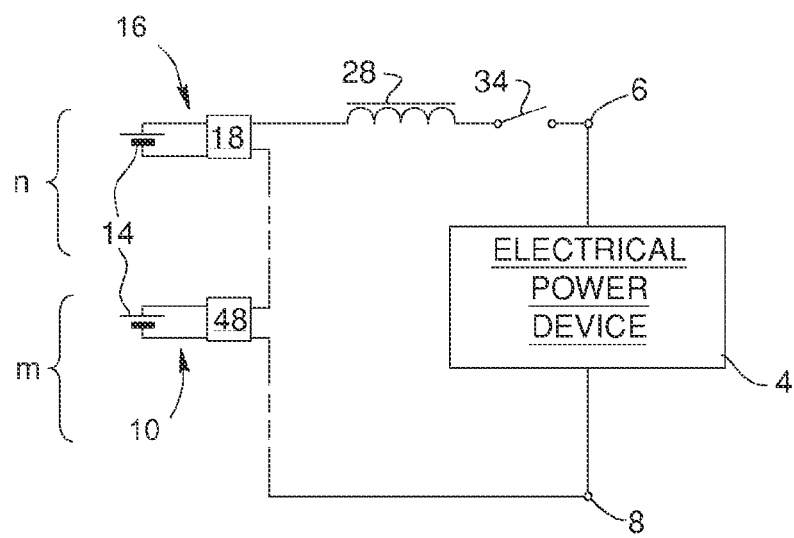
FIG. 18 is a schematic diagram showing an embodiment of the quick charging system with converter and energy internal storage stages that may be used for energy storage and return with an electrical power device.

The multi-stage quick charging system may take various configurations depending on whether it is intended for applications involving an electrical network 2 and a power battery as electrical power device 4 (as shown in FIGS. 2, 3, 4, 5, 7, 8 and 15), or for energy storage and return applications as in the case of a subway rail as electrical power device 4 (as shown in FIGS. 16, 17 and 18).

The control unit 38 may take the form of a microcontroller, computer, integrated circuit, etc., with processor(s) or processing unit(s), memory(ies) and control interface(s) that may be connected to the different components to be controlled or generating measurements in the system, and configurable by programming or other appropriate way to the desired system operating parameters and modes.

The number m of energy internal storage stages 10 may be null when two or more converter stages 16 are used and they include a power battery module 14 and optionally a charger 12 connected or not to a supply source 20 (or 2).

The multi-stage quick charging system of the invention provides a solution to the converter size problem by using an intermediate power battery formed of at least a battery module 14 as voltage supporting point so that a converter 18 having a fraction of the output voltage may control the entire power flow 22 towards (or from) the battery e.g. of an electric vehicle or another electrical power device 4.

Figure 1:
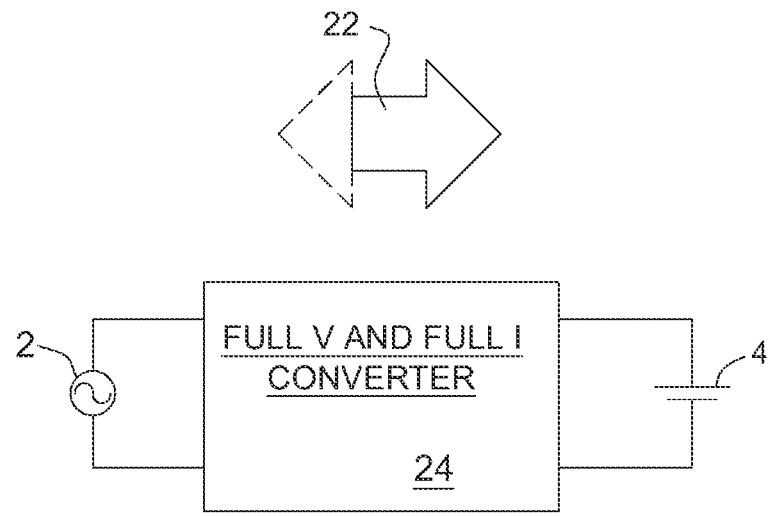
FIG. 1 is a schematic diagram showing that in a classical charger, the output converter must be sized to carry the entire power.

Referring to FIG. 1, there is shown a classical situation where a converter 24 must be sized for the entire power 22 that must flow between a supply network 2 and a battery 4 e.g. of an electric vehicle. This requires a particularly large size of converter.

Figure 3:
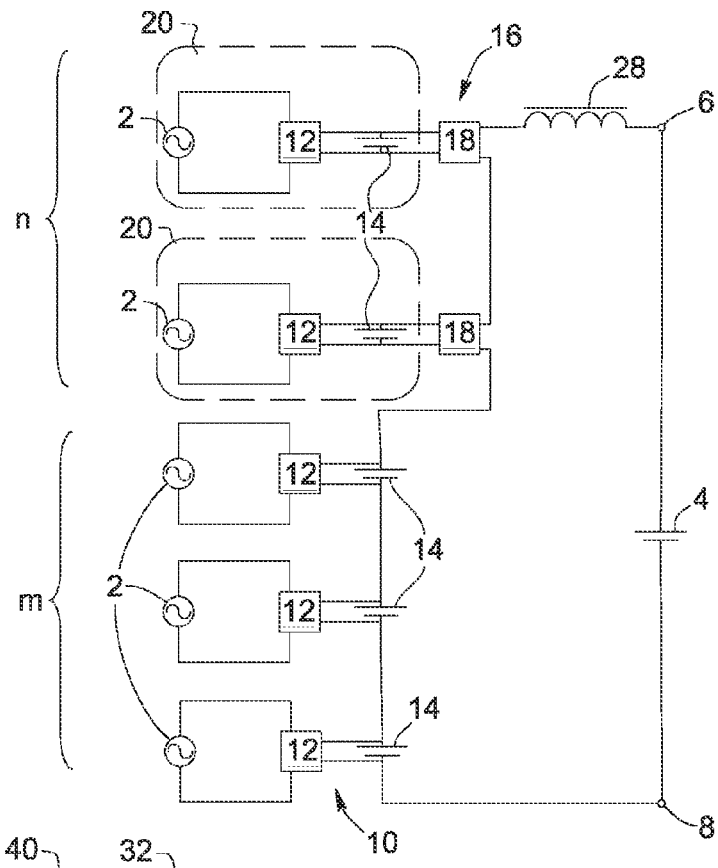
FIG. 3 is a schematic diagram showing that in order to better manage the balancing of the charge levels of an intermediate battery, the intermediate battery may be subdivided into modules each having its slow charger.

Referring again to FIG. 2, a small charger 12 allows a slow recharging of a battery module 14. The utilization factor problem is thus solved. Since the intermediate power battery 14 may reach many hundreds of volts, several stages formed of power battery modules 14 are preferably used as shown in FIG. 3. It is thus possible to consider the splitting of the charger 12 into a plurality of smaller chargers 12 associated to the respective battery modules 14 of the stages as shown in FIG. 3. This splitting allows solving much of the problem of the charge balancing management of the battery modules 14 since the chargers 12 may be controlled in order to separately vary the contribution of each stage.

The cost of the battery modules 14 is likely to be mostly absorbed by the savings on the billing for the subscribed power and, in many cases, by the savings on the size of the power converter(s) 18 involved in the energy transfer with the electrical power device 4.

Furthermore, as a plurality of elements in series is used, it is possible to take advantage of this fact to implement a multi-stage PWM (Pulse Width Modulation) strategy at the level of the chargers 12. Indeed, as the power battery modules 14 have a very low impedance and a virtually constant voltage for charge levels typically but not restrictively ranging from 5 to 95%, they are comparable to ideal voltage sources, thus simplifying the topology and the control of the resulting multi-stage system. The wave quality on the network side 2 may thus be advantageously increased.

The capacity of the multi-stage system of the invention to generate SPWM (Sinusoidal Pulse Width Modulation) waveforms submitted to the network 2 thus allows providing assistance services to the network 2 as above-mentioned.

Embodiments of the multi-stage quick charging system in which the slow charger(s) 12 or the stages 10, 16 may be not connected to a network 2, as shown in FIGS. 16, 17 and 18, may be used to recover and return braking energy when a DC train or a subway enters in station. The charger(s) 12 may thus only serve for the load balancing of the stages 10, 16. The regenerative braking works regardless of whether the charger(s) 12 are connected to the network 2. In this kind of embodiments, the electrical power device 4 may be formed of a relatively fixed counter-electromotive voltage and low impedance load as opposed to a resistive load. It will be herein referred to as a voltage type load or simply a voltage load. This may be rails connected to a DC supply network of a subway or a train catenary.

The invention is based on the fact that the electrical power device 4 (e.g. an electric vehicle battery) and the battery module(s) 14 have a high no-load voltage with respect to the voltage drops caused by the internal impedances. The converter 18 may, with a small voltage, cause a flow of high currents provided that it can compensate the voltage differences between the electrical power device 4 and the battery module(s) 14 plus the voltage drops of their internal impedances. The current, and consequently the power, may be controlled in both directions with a power converter 18 having a configuration for operating in two quadrants and able to carry the entire current.

An inductor 28 connected between the terminal 6 and the power converter 18 of the converter stage 16 allows smoothing the current and especially avoiding current pulses by absorbing instant voltage differences in the advantageous case where the power converter 18 is formed of a voltage source type half-bridge (VSC or Voltage Source Converter).

The electrical supply source 20 may derive from the electrical network 2, but also from an additional intermediate battery module 14 that may be also coupled to a slow charger 12 coupling to the electrical network 2 as shown in FIG. 3.

The charger(s) 12 may be unidirectional as well as bidirectional. In the second case, it may actively contribute to support the electrical network 2 for example during a peak. If unidirectional, the assistance to the electrical network 2 remains possible to some extent, for example by limiting consumption during peak hours.

Depending on the configuration of the multi-stage quick charging system, the charger(s) 12 has an insulation stage such as a transformer 31 (as shown for example in FIG. 16) to ensure an appropriate referencing of the voltages of each stage 10 (and 16 if applicable). Other configurations described hereinafter may do without such insulation, which results in a reduction of the component number, the costs and also the losses.

Figure 11:
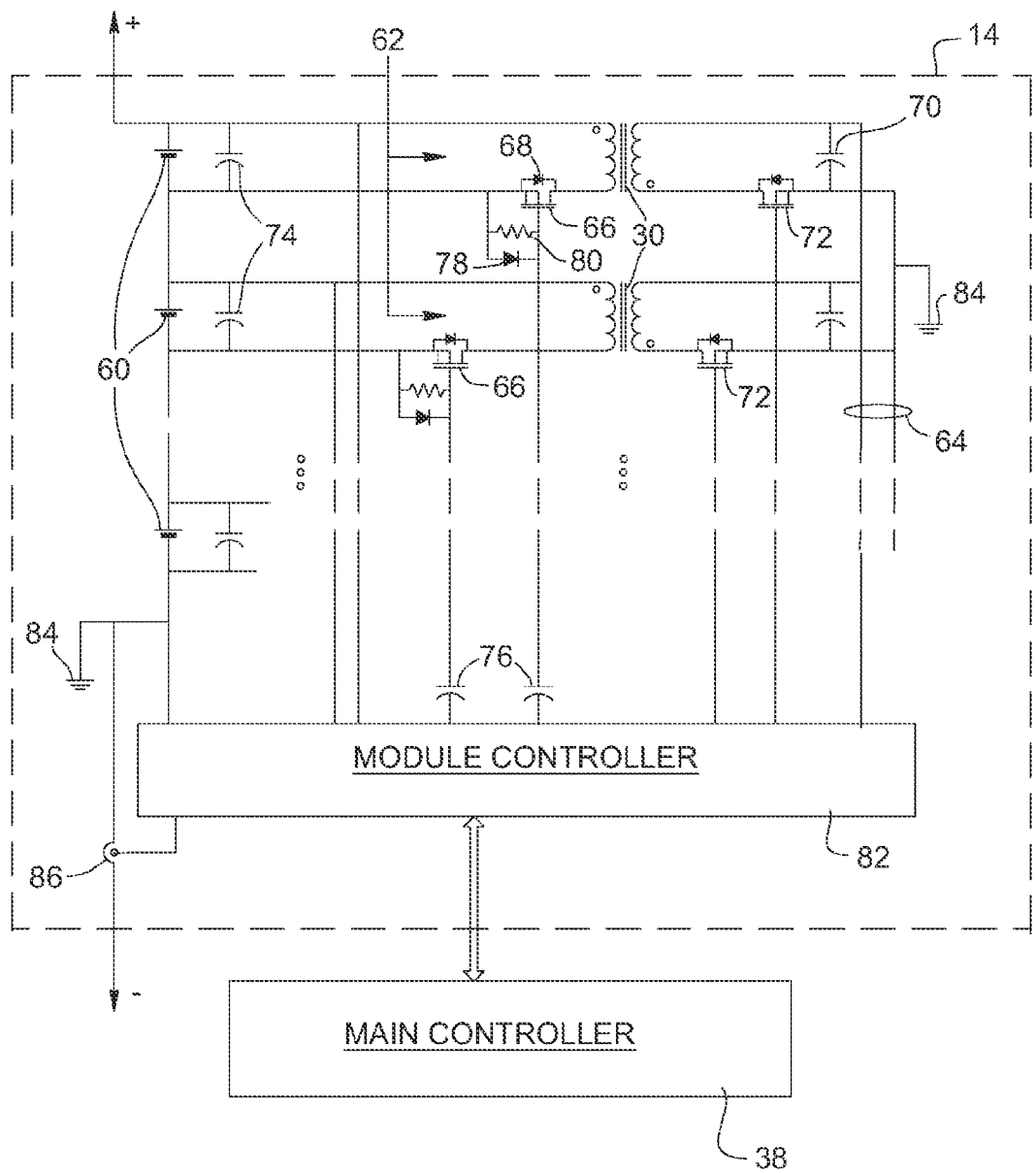
FIG. 11 is a schematic diagram showing a system for an individual balancing of cells of an intermediate battery module.

Referring to FIG. 3, there is shown how several stages 10, 16 may be arranged in series. The battery modules 14 of the internal storage stages 10 are connected in series with the power converters 18 of the converter stages 16. In the illustrated embodiment, the supplies of the stages 16 are themselves made of battery modules 14 and slow chargers 12. Thus, all the stages 10, 16 have a charger 12. If the chargers 12 are bidirectional, the charge balancing of the stages 10, 16 may also be improved since a battery module 14 whose charge level is higher may now provide some energy to the other stages 10, 16. In the unidirectional case, it is still possible to separately modulate the charging power of the chargers 12, for example through the control unit 38 (as shown in FIG. 11) configured to have an operation mode accordingly.

Figure 4:
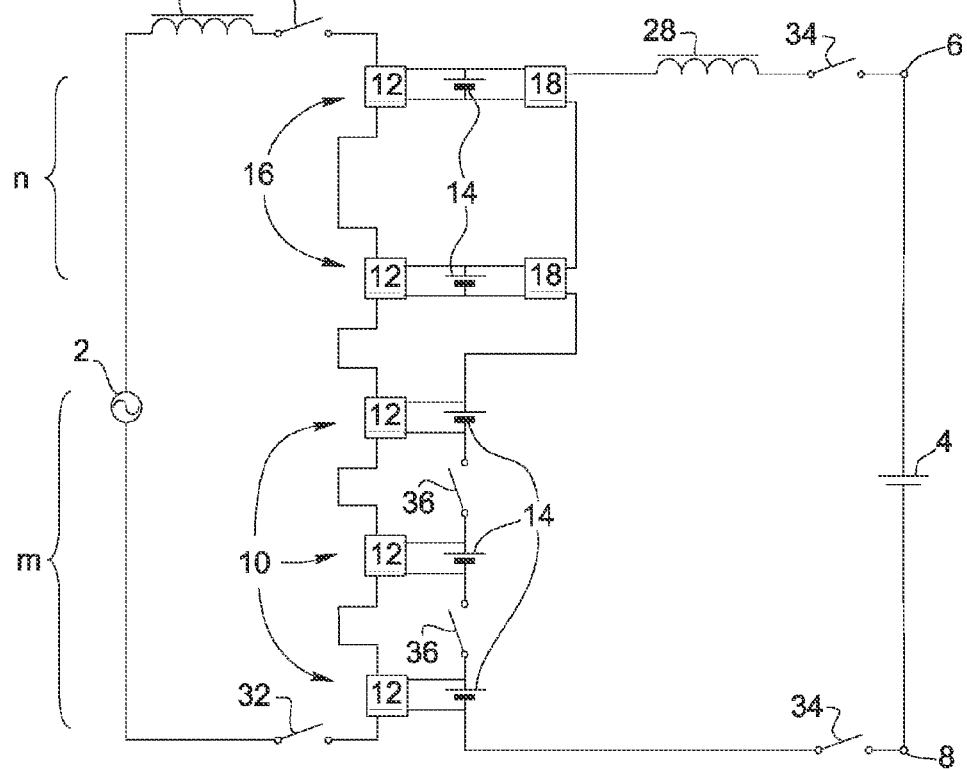
FIG. 4 is a schematic diagram showing an embodiment where a non-simultaneous operation of slow chargers on one hand, and of output converters on the other hand, allows avoiding having recourse to insulating transformers with respect to the electrical network.

Referring to FIG. 4, there is shown an embodiment where use of contactor modules 32, 34 allows doing without insulation transformers in the chargers 12. The chargers 12 only have a VSC portion. In that embodiment, the slow recharging of the battery modules 14 does not occur at the same time as the exchange with the power battery forming the electrical power device 4. It is a minor inconvenience since the quick recharging of the power battery 4 only takes a few minutes with respect to the hours required (imposed by the network 2) to charge the battery modules 14. For the slow recharging of the battery modules 14, the contactor modules 32 are closed and the contactor modules 34, 36 are opened. For the quick recharging of the power battery 4, it is the opposite. For security, an interlock preferably of mechanical type prevents the simultaneous closing of the contactor modules 32 with the contactor modules 34, 36.

This mechanism of contactor modules 32, 34, 36 with interlock allows connecting in series the converters 18 and battery modules 14 (via the contactor modules 36) of the stages on the quick charging side (towards the target battery 4) as well as the chargers 12 of the stages on the network side 2 since the multiple voltage referencing problem is eliminated. Many advantages results thereof.

High voltages as much on the network side 2 as on the vehicle (or other device) side may be easily obtained, since there is no longer any insulation transformer that needs to carry a sum of the stage voltages.

Figure 5:
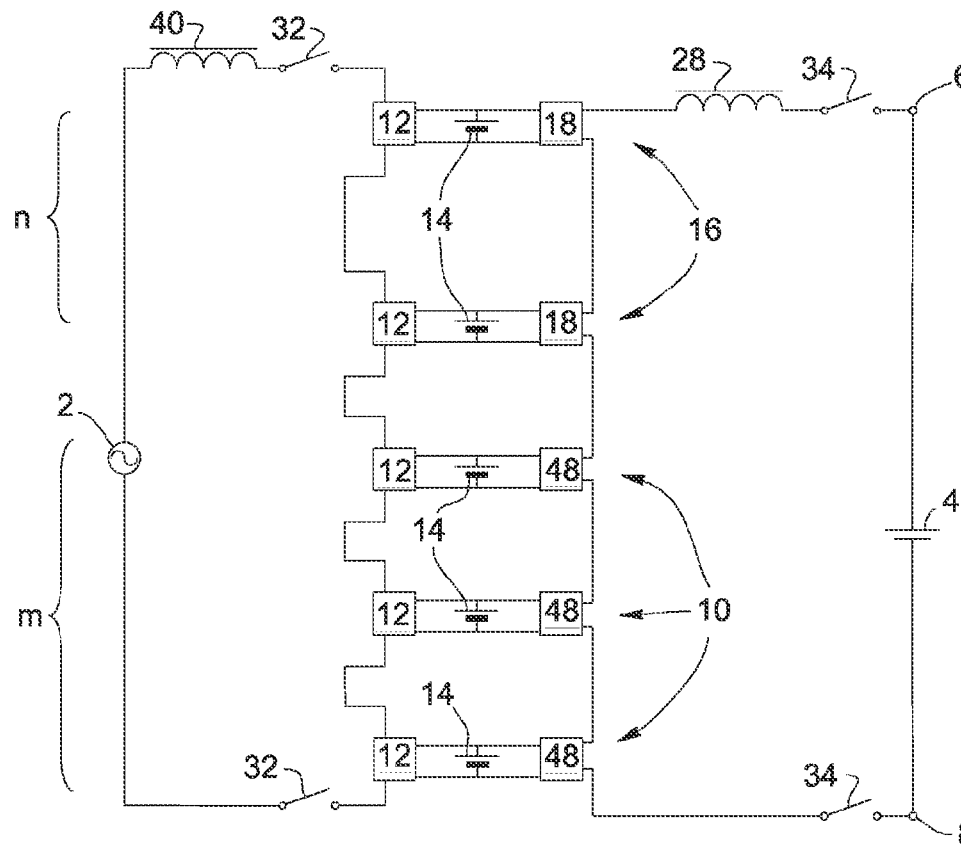
FIG. 5 is a schematic diagram showing that contactor modules are used to preselect a more favorable fixed voltage level for the output converters.
Figure 9A:
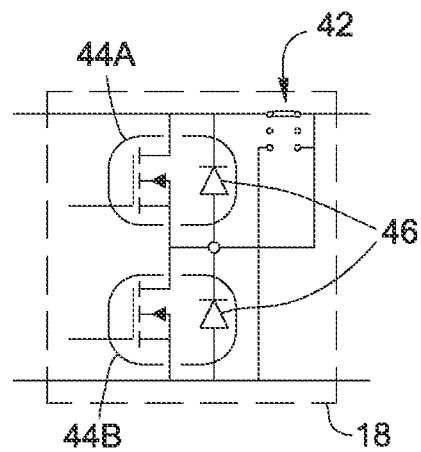
FIG. 9A is a schematic diagram showing details of a two-quadrant converter module used as power converter.
Figure 9B:
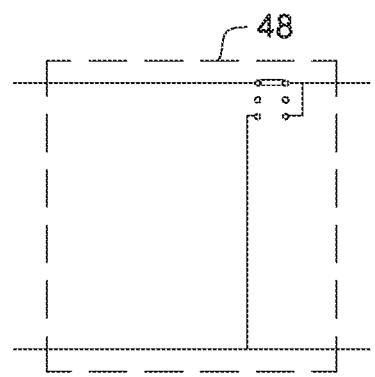
FIG. 9B is a schematic diagram showing details of a contactor module.
Figure 10:
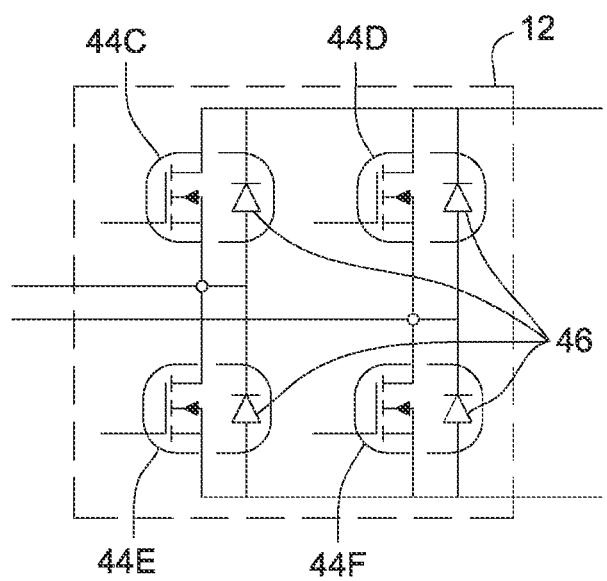
FIG. 10 is a schematic diagram showing details of a four-quadrant voltage converter module.

The converters formed by the chargers 12 and the converters 18 are reduced to their simplest expression, that is respectively a VSC bridge as shown in FIG. 10 and a VSC half-bridge as shown in FIG. 9A, with no transformer or inductor other than the inductors 28 and 40 that they collectively share. The transformation losses are thus eliminated. The converters 18 may be optionally provided with contactor modules 42 as shown in FIG. 9A to bypass them when they are not required and thus reduce the losses. Contactor modules 48 as shown in FIG. 9B may replace the contactor modules 36 as shown in FIG. 5, not only allowing insulation during operation of the chargers 12 but also bypass of one stage 10 during transfer with the power battery 4.

As each stage 10, 16 is guaranteed its individual voltage by its associated battery module 14, the semi-conductors 44A, 44B, 44C, 44D, 44E, 44F (as shown in FIGS. 9A and 10) used in the converters 12 and 18 may be of low voltage type. In particular, if MOSFETs are used, it becomes possible to choose some having very low drain-source resistance drastically reducing the losses. Moreover, the MOSFETs are provided with an intrinsic anti-parallel diode 46 which eliminates the need to add an external one. The efficiency may still be further increased by operating the MOSFETs as synchronous rectifiers, i.e. that each MOSFET is maintained to "ON" most of the time during which the reverse current flows, in order to do away with the junction voltage drop of the anti-parallel diode 46.

Another advantage of the series arrangement comes from the fact that the network side 2 has a multitude of voltage levels now available for multi-stage SPWM. The switching losses are reduced since a lower frequency modulation may be used. This also allows reducing the size of the inductor 40 in the case where it would be required, with its costs and its losses. The inductor 40 may be formed by the equivalent inductance from the network 2.

The SPWM allows support functions for the network 2 and working at unitary power factor. Appreciable levels of apparent power from or towards the network 2 may be handled in a cost-effective manner.

Referring to FIG. 5, there is shown a preferred embodiment where contactor modules 48 (also shown in FIG. 9B) allow preselecting a fixed voltage value provided by the energy internal storage stages 10. By bringing the fixed voltage value as close as possible to that of the battery 4, the required number of stages 16 provided with converters 18 may be reduced.

Figure 8:
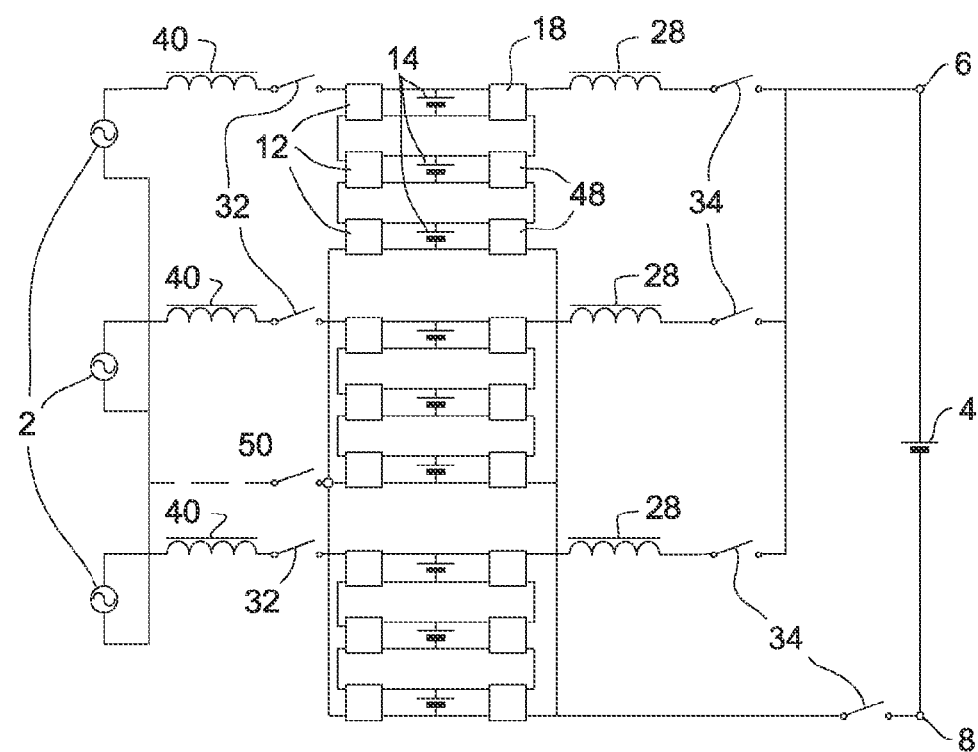
FIG. 8 is a schematic diagram similar to FIG. 7, but with a parallel arrangement.

To reduce the costs and increase the life of the contactor modules, the converters 18 and the chargers 12 configured into VSC may be used to reduce the currents to zero prior to any operation of the contactor modules 32, 34, 36 (shown in FIG. 4), 42 (shown in FIG. 9A), 48 (shown in FIG. 9B) and 50 (shown in FIG. 8). Likewise, the converters 18 and the contactor modules 48 may be used so that the no-load voltage of the quick charging system is virtually that of the battery 4 prior to any closing of the contactor modules 34. The chargers 12 configured into VSC in the stages 10 and 16 may be used so that the total AC voltage of these chargers in series matches approximately the instant voltage of the network 2 prior to any closing of the contactor modules 32.

To more easily manage a charge distribution between the power battery modules 14, a larger than necessary number of stages 16 provided with converters 18 may be incorporated in the system. Selection of the minimal number of converters 18 required at a given moment may be established by the contactor modules 42 as shown in FIG. 9A, depending on whether they are set in bypass position or not. The converters 18 in bypass position may be insulated and shunted by their contactor modules 42, reducing the conduction losses.

Figure 6:
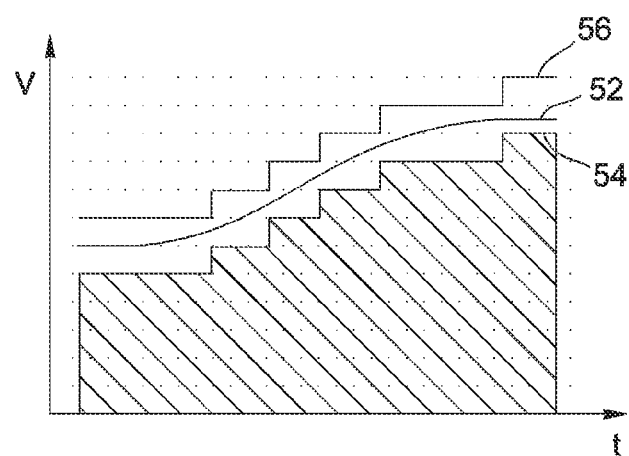
FIG. 6 is a schematic diagram graphically showing a common operation strategy of the contactors and the converters.

Referring to FIG. 6, there is shown that with a minimum of two active levels (converters 18 not shunted by a contactor module 42 as shown in FIG. 9A), a rapidly adjustable voltage margin is preserved all the time. In FIG. 6, curve 52 represents the desired voltage, curve 54 represents the voltage of the fixed stages 10, and curve 56 represents the maximal discrete voltage obtained with the active levels of the stages 10 and 16. The range between curves 54 and 56 represents the voltage values dynamically available by PWM. This margin allows keeping a control of the current in order to avoid a runaway. However, to address such an eventuality, recourse to classical protection devices (not shown) by fuse or circuit breaker is preferred.

Figure 7:
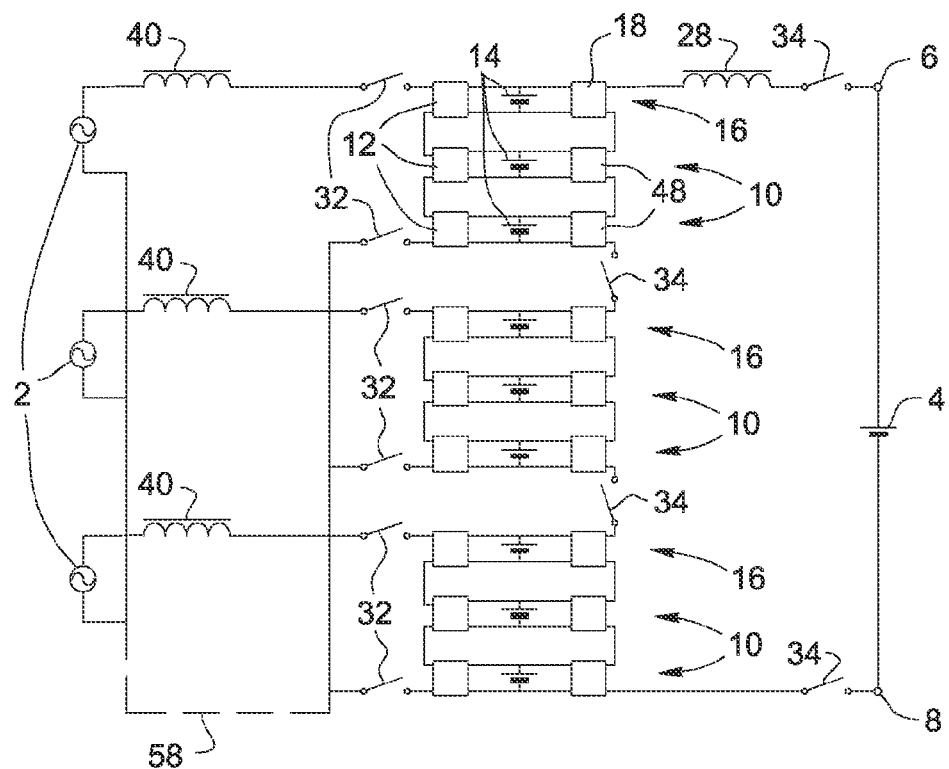
FIG. 7 is a schematic diagram showing a three-phase adaptation with a series arrangement of the output voltages of the modules associated with each of the phases.

Referring to FIGS. 7 and 8, there is shown three-phase adaptations of a system as that of FIG. 5. These adaptations allow more important power levels better adapted to service stations for electric vehicles or recharging stations for electric buses. FIGS. 7 and 8 respectively show series and parallel arrangements of groups of output stages 10, 16. In the case of parallel groups (FIG. 8), which also comprise stages 10, 16 in series within a same group, less contactor modules 32 are required. A contactor module 50 (FIG. 8) or a jumper 58 (FIG. 7) may be required depending on the applicable grounding regulations.

Referring to FIG. 11, the power battery modules 14 may be made of several elementary cells 60 in series, combined with a balancing and management system. The fine balancing between cells 60 of a same battery module 14 may be essentially insured by small bidirectional flyback converters 62 intended to transfer a succession of small charges from the more charged cells 60 towards the less charged ones over a long time period. It will be shown hereinafter how more important balancing powers between the battery modules 14 may be obtained via the chargers-converters 12, the converters 18 and the contactor modules 48 (shown for example in FIG. 5).

The fine balancing may be achieved through intervention on each of the cells in series. Since the set of battery modules 14 may be formed of hundreds of cells 60 in total, it is advantageous to reduce the number and size of the elements which have an impact on the cost. The technique with small bidirectional flybacks 62 is advantageously suitable for this purpose.

Energy transfer may be achieved via a bus 64 specific to each of the battery modules 14. The bus 64 may be extended so as to cover several battery modules 14 if desired, although this might be less practical for example for the insulating considerations of the transformers 30. To transfer a small energy block from a cell 60 towards the bus 64, it is a simple matter of causing the MOSFET 66 corresponding to the cell 60 to conduct for creating a flow in the core of the corresponding transformer 30 and to cut off the current before reaching saturation. At the cut-off, the intrinsic diode 68 of the corresponding MOSFET 72 will begin to conduct and the flow will fall back to zero by recharging the capacitors 70 of the common bus 64. A transfer in reverse direction is also possible by interchanging the role of the MOSFETs 66 and 72. Thus, a pulse on the gate of a MOSFET 66 transfers an energy block towards the bus 64 while a pulse on the gate of a MOSFET 72 transfers an energy block towards the corresponding cell 60. Preferably, the MOSFETs 66, 72 are also activated during time periods corresponding to the conduction of their respective intrinsic diode 68 in order to reduce the losses (synchronous rectification).

The capacitors 70, 74 are located close to the flybacks 62 to minimize the switching loops. The capacitors 76, the diodes 78 and the resistors 80 are used to adapt the pulse levels to satisfy the voltage references that are different from one stage to another. The bus 64, in turn, is referred to a module controller 82 via the ground 84, which is different from one battery module 14 to another.

The controller 82 may control the gate pulses so as to maintain the voltage on the bus 64 and thereby ensure that the sum of the net transfers is zero. The controller 82 may also handle the collection of the cell voltages, the module current by means of a sensor 86, and possibly temperatures. The controller 82 is preferably in constant relation with the main controller 38 of the system and shares the tasks therewith. Apart from the balancing, both controllers 82, 38 handle the protection of the battery modules 14 in particular by monitoring cell voltage and temperature abnormal excursions. The main controller 38 may also handle the operation of the contactor modules 32, 34, 50 (shown in FIGS. 7 and 8), 42 (shown in FIG. 9A), and 48 (shown in FIG. 9B).

Since the fine balancing current is not recorded by the sensor 86, it may be estimated by the voltages of the cells 60, the voltage of the bus 64 and the width and number of the pulses along with the known inductance value of the transformers 30.

As the small flybacks 62 limit the intra-module balancing power for the aforesaid simplicity and cost reasons, it should be ensured that the cells 60 inside a same module 14 are uniform (same lot and same aging history) and that they are subjected to the same conditions.

If the size of the system requires a large number of cells 60 in parallel, it is preferable to consider a paralleling of entire columns in a similar manner to FIG. 8. Indeed, the stage by stage paralleling would require a means to separately control the current in a large number of points, with the current moreover reaching high values.

Figure 12:
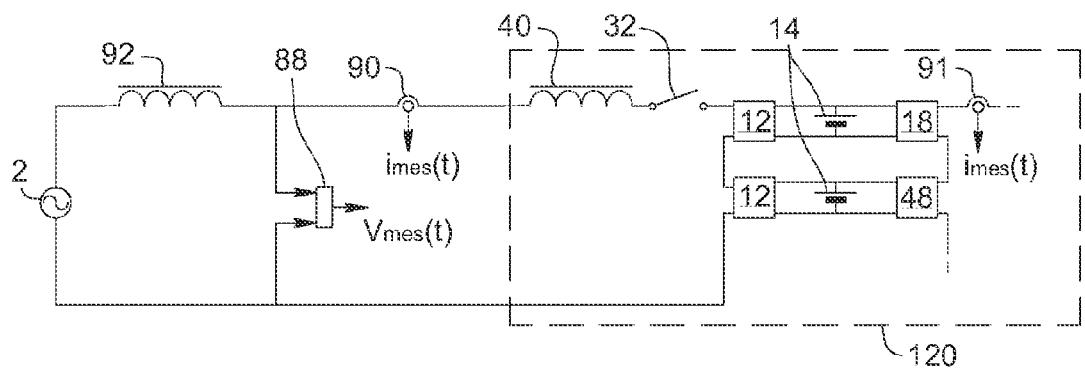
FIG. 12 is a schematic diagram showing a contextualization of a multi-stage quick charging system and measurement points used for its control.

Referring to FIG. 12, there is shown an example of use context comprising measurement points provided by a voltage sensor 88 producing a measured voltage $V_{mes}(t)$ and a current sensor 90 producing a measured current signal $i_{mes}(t)$ as required for controlling the current during the recharging of the intermediate battery modules 14 or for the assistance to the network 2. The inductor 92 represents the equivalent inductance of the network 2, while the inductor 40 represents here the inductance forming part of the system.

Figure 13:
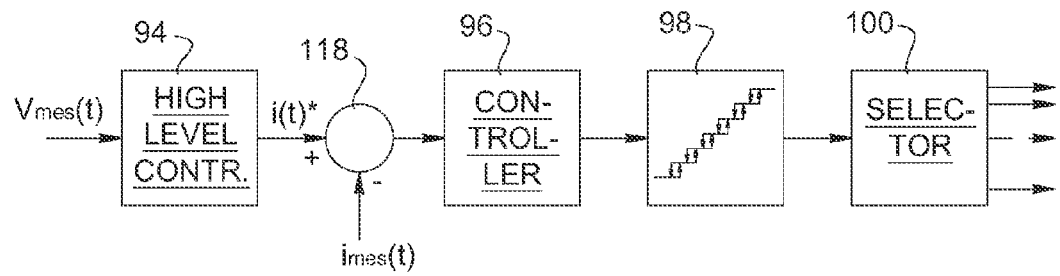
FIG. 13 is a schematic diagram showing a closed loop control of the instant current by acting on the individual modules.

Referring to FIG. 13, there is shown a control system capable of managing the converters 12 (shown for example in FIG. 12) in order to follow a network current setting, which satisfies one or many functions such as the unitary power factor recharging, the peak management or even the energy return towards the network 2. The control system may be integrated to the main controller 38 (shown in FIG. 11) or embodied otherwise if desired. The control system comprises a high level controller 94 that determines the appropriate current for example according to classical distributed production techniques. A controller 96, possibly of a proportional plus integral type, produces a target voltage which is discretized by a block 98 that provides a voltage which may translate into a number of tandems 12 and 14 (shown for example in FIG. 12) in series required at any moment. A block 100 individually connected to the bridges 12 (shown for example in FIG. 12) has a decision algorithm that determines which ones of the tandems 12 and 14 will be put to contribution in order to balance the charge levels between the battery modules 14 (shown for example in FIG. 12) and to minimize the consecutive switchings on each of the semi-conductors 44C, 44D, 44E, 44F (shown in FIG. 10). A multi-stage PWM strategy is thus effectively implemented.

Referring again to FIG. 10, when a module 12 is put to contribution to produce a positive voltage, the MOSFETs 44C and 44F are set in conduction. For a negative voltage, it is the MOSFETs 44D and 44E. For a zero voltage, the current must still pass and there are two possibilities: conduction of MOSFETs 44C and 44D or conduction of MOSFETs 44E and 44F. Preferably, both possibilities are used as often as the other in order to distribute the dissipation evenly between the semi-conductors 44C, 44D, 44E, 44F. In every case, break-before-make transitions are performed to avoid short-circuiting the battery modules 14. Decoupling capacitors (not shown) on the DC side close to a bridge 12 allow reducing the switching loops.

Figure 14:
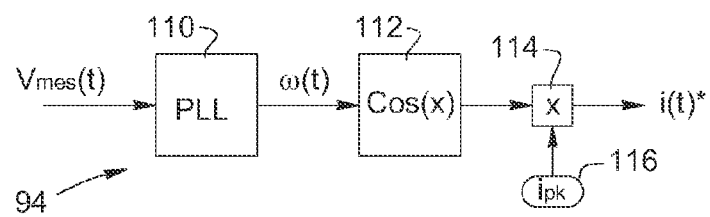
FIG. 14 is a schematic diagram showing an example of a high level controller to generate an instant current setting.

Referring to FIG. 14, there is shown an example of high level controller 94 intended for the particular case of a unitary power factor charging. A phase locked loop (PLL) 110 provides the instant angle $\omega(t)$ of the voltage fundamental relating to the $V_{mes}(t)$. A cosine block 112 reconstructs a signal having a same phase but of unitary amplitude. The resulting signal is multiplied 114 by the desired amplitude of the current $i_{pk}$ 116 to provide the instant current target i(t)* which will be transmitted to the summing block 118 (shown in FIG. 13).

In another case where power reversal would be desired, it would be a simple matter of inverting the sign of the output of the multiplier 114 or adding 180 degrees at the input of the block 112.

Referring again to FIG. 12, in an operation mode where the battery modules 14 exchange their energy with that of the electrical power device 4 (like the power battery as shown for example in FIG. 2), the measured current signal $i_{mes}(t)$ derives from a current sensor 91 connected to the power converter 18, and the control loop of the instant current i(t)* may be formed of blocks 118, 96, 98, 100 shown in FIG. 13, if a large number of modules 18 not bypassed by contactor modules 42 (as shown in FIG. 9A) is used. A multi-stage PWM is also obtained here. However, this may impair the efficiency since the currents are very high (close to an order of magnitude above those involved during use of the modules 12) and it is preferable to maintain the number of semi-conductors subjected to the high currents in question at the minimum.

For the control of the instant current i(t)*, it is thus preferable to work with two modules 18 not bypassed (active) providing a fine adjustment of the current with a classical two or three level PWM strategy. This does not prevent changing the active modules 18 every minute, for example, to balance the charge/discharge level of the battery modules 14.

Since, in this mode, the voltage of the battery modules 14 and that of the electrical power device 4 retain the same sign, it is possible to maintain the current adjustment in both directions with a half-bridge 18 formed of the semi-conductors 44A and 44B (as shown in FIG. 9A). In a similar way to the operation of the modules 12, a module 18 exhibits a positive voltage if the MOSFET 44A (or its intrinsic diode 46) is in conduction and a zero voltage if the MOSFET 44B (or its intrinsic diode 46) turns into conduction. Once again here, a break-before-make switching sequence is followed and decoupling capacitors (not shown) are arranged on the DC side close to the semi-conductors 44A and 44B.

Up to this point, the described instant currant control strategies by multi-stage PWM or not, as much for the modules 12 as 18, ignored the sequencing of the contactor modules 32, 34, 36 (as shown in FIG. 4), 42, 48 (shown in FIGS. 9A and 9B) and 50 (shown in FIG. 8). Their operation is described in the following lines, with a power battery (e.g. of an electric vehicle) used as an example of electrical power device 4. The action of the PWM is fast and continuous by nature whereas the contactor modules 32, 34, 36, 42, 48, 50 are used only a few times during an energy transfer cycle with the power battery 4. They are also used to change the operating mode (active network side 2 vs active battery side 4).

In exchange mode with the network 2, the following steps may be performed:

1. Initially, the contactor modules 32, 34, 50 (if applicable), 42 and 48 are opened.
2. Putting the appropriate number of converter modules 12 to contribution to approximate the no-load voltage of the network 2 that will prevail at the estimated closing moment of the contactor modules 32 and 50.
3. Closing the contactor modules 32 and 50.
4. Letting the controllers 94 and 96 operate to obtain the appropriate current. For a more aggressive charge level balancing, it is possible to replace two null stages 12 by one of positive voltage and one of negative voltage. The effect on the network 2 will be imperceptible, but an effective energy exchange between the battery modules 14 will occur. Furthermore, towards the end of the recharging, if only a few battery modules 14 need further charging while the others are full, it is possible to use this same technique by interchanging the role of each module 14 so that the mid-term net transfer is null for the full modules 14 and positive for the few others that remain.
5. When the charging of all the modules 14 is complete, gradually reducing to zero the current specified by the setting 116.
6. Opening the contactor modules 32 and 50.

In exchange mode with the battery 4, the following steps may be performed:
1. Initially, the contactor modules 32, 34, 50 (if applicable), 42 and 48 are opened.
2. The vehicle (or other electrical device) containing the battery 4 and the system negotiate a charging current timing profile as function, among other things
   of the energy need of the battery 4,
   of the remaining capacity of the modules 14,
   of the battery technology involved,
   of the final relaxation period intended to balance the cells of the battery 4 or even that of the modules 14.
3. The voltage of the battery 4 is measured.
4. A scenario is established by the main controller 38 which subdivides the upcoming charge period in some segments of a few minutes (or less) so as to
   distribute the energy to be drawn out between the modules 14 according to their individual state of charge (or SOC),
   minimizing the number of operations of the contactor modules,
   leaving a minimum of two modules 18 in active state (PWM).
5. The contactor modules 42 and 48 are configured according to the first segment of the scenario. If a stage is required for PWM, the contactor module 42 will be opened. Otherwise it will be in one of the two other positions. The contactor modules 48 of the non-PWM stages will have to be in one of the two extreme positions (the central position cannot be used, because the current must pass) depending on whether the corresponding module 14 must be put into contribution or not. The total of the voltages of contributing modules 14 must approximate the voltage measured in step 3.
6. The contactor modules 34 are closed.
7. The PWM stages continuously participate in the current control according to the profile negotiated in step 2.
8. If the voltage of the two active PWM stages required to control the current comes close to more than a module half-voltage from the limit that would cause it to loose control, a reconfiguration is initiated: the current is reduced to zero by both PWM stages, and then a new configuration of the contactor modules 42 and 48 is made in order to recenter the adjustable voltage range around the new required value (FIG. 6); finally, the current is set back to its desired value by the action of the PWM stages.
9. Likewise, when the end of a segment of the scenario is reached, the current is set back to zero, the contactor modules 42 and 48 are reconfigured and then the current is set back to its desired value thereby initiating the next segment.
10. At the end of the last segment, the current is decreased to zero, and then all the contactor modules 32, 34, 50 (if applicable), 42 and 48 are opened. Alternately, the last segment may be prematurely stopped, and then the ending may be reassessed as function of the effective charge level remaining in each module 14 and as function of the needs of the battery 4.

In the case where the battery impedances would be high or in the case where the voltage of the modules 14 would be low, it is possible that more than two active stages 18 are continuously required. The procedure remains however similar.

It is possible to imagine a situation requiring a transfer of an energy block from the battery 4 towards the battery modules 14 (for example to use the energy of a vehicle during a network breakdown). The procedure would be the same except for the current that would be of opposite sign. Of course, the modules 14 must be initially sufficiently discharged to accept the energy block.

Referring to FIG. 15, there is shown an embodiment applicable, for example, to a service station and which allows overcoming the limitation of the sequential operation of the topologies of FIGS. 4, 5, 7 and 8: since an important local storage amount is required, it is advantageous to divide it in several chargers 120 (as shown in FIG. 12, their contactor modules 32 and 34 being shown outside to illustrate the principle). Each recharging nozzle 122 has the possibility to be connected to one among several chargers 120 through a plurality of contactor modules 34. Thus, a single one among a group may be used for recharging while the others go on with the charging of their local reserve 14 by the network 2. Each time, a different charger 120 may be automatically used, thereby distributing the charge between them. For a three-phase network 2, the selection may also take into account the approximate balancing of the currents.

Referring to FIGS. 16, 17 and 18, there are shown embodiments of the charging system that may be particularly suitable for an application where the electrical power device 4 is formed of subway rails or a train catenary. For simplification purposes only, reference will be made in the following description to subway rails. It must however be understood that the embodiments of the system are not limited to this example.

Referring in particular to FIG. 16, there is shown an embodiment of the multi-stage charging system comparable to that of FIG. 3 where the chargers 12 may be of low power, but more complex (not simple VSC) due to the insulation stages 31 used because the chargers 12 are connected together with a parallel bus 124. A series loop 126 (as shown in FIG. 17) may replace the parallel bus if the topology of the chargers 12 allows it. The system of FIG. 16 may remain permanently connected with the rails 4 if desired.

Referring to FIG. 17, there is shown an embodiment of the multi-stage charging system comparable to that of FIG. 5, but without the network 2. The chargers 12 may be formed of low current two-quadrant VSC. The converters 18 may be formed of high current VSC. In such a case, the series loop 126 connecting them has a series arrangement formed of an inductor 40 and a contactor module 32. A series arrangement formed of an inductor 28 and a contactor module 34 is connected between the terminal 6 and one of the converter stages 16. In this embodiment, the balancing of the battery modules 14 via the chargers 12 cannot occurs simultaneously with the arrival (recharging of the battery modules 14) or the departure (return of energy stored in the battery modules 14) of a subway train. The aforesaid balancing relates to exchanges between entire power battery modules 14. A very slow balancing between the cells 60 (shown in FIG. 11) of a same battery module 14 remains. An extension of the bus 64 (shown in FIG. 11) to other power battery modules 14 allows exchanging small powers between the power battery modules 14.

Referring to FIG. 18, there is shown an embodiment of the multi-stage charging system that represents a particular case of that of FIG. 17, where the chargers 12 and the loop 126 including the inductor 40 and the contactor module 32 are omitted. The distinct balancing of the energy internal storage stages 10 involves some additional operations of the contactor modules 48 if m>0 (m representing the number of energy internal storage stages 10). If m=0 (and thus n≥2), the complete balancing may be achieved in a continuous way, even during the starts or stops of subway trains, without having to operate contactor modules (or switches).

While embodiments of the invention have been illustrated in the accompanying drawings and described above, it will be evident to those skilled in the art that modifications may be made therein without departing from the invention. For example, the contactor modules 32, 34, 36, 42, 48, 50 may be embodied by semi-conductor switches or other types of appropriate switches if desired. When n≥2 and n+m≥4, and in particular when the required voltage or power levels involve a large number of stages 10, 16, the stages 10, 16 may be distributed so as to form groups (or columns of groups) connected in parallel or in series (as in FIGS. 7 and 8) connected between arrangements comprising inductors 28, 40 and switches or contactor modules 32, 34 selectively operable to select the groups of stages 10, 16 in condition to exchange energy with the electrical power device 4.

The invention claimed is:

1. A multi-stage quick charging system for exchanging energy with an electrical power device that imposes a predetermined voltage, the quick charging system comprising:
    terminals for connection with the electrical power device;
    a number n of converter stages and a number m of energy internal storage stages connected in series to each other between the terminals, with n≥1, m≥0 and n+m≥2, each converter stage having a power converter coupled, on a side of the power converter opposite to a side of the terminals, to an arrangement comprising at least one of an intermediate power battery module and a connection to an electrical supply source, each energy internal storage stage having an intermediate power battery module, each intermediate power battery module being characterized by a high no-load voltage with respect to voltage drops caused by internal impedances of the intermediate power battery module, the intermediate power battery module of each energy internal storage stage and the power converter of each converter stage being connected together in order to be in condition to exchange energy with the electrical power device;
    a control unit controlling a contribution of each converter stage and, when applicable, of each energy internal storage stage for exchanging energy with the electrical power device; and
    an inductor connected between one of the terminals and one of the converter stages.

2. The quick charging system according to claim 1, wherein:
    m=0; and
    the arrangement of each converter stage comprises the corresponding intermediate power battery module,
    the quick charging system further comprising:
    a series arrangement formed of an inductor and a switch connected between one of the terminals and one of the stages.

3. The quick charging system according to claim 1, wherein:
    m≥1;
    the arrangement of each converter stage comprises the corresponding intermediate power battery module; and
    at least one of the energy internal storage stages further has a contactor module operatively coupled to the corresponding intermediary power battery module to selectively bypass, switch on and switch off the corresponding intermediate power battery module,
    the quick charging system further comprising:
    a series arrangement formed of an inductor and a switch connected between one of the terminals and one of the stages.

4. The quick charging system according to claim 2, wherein:
    the arrangement of several ones of the converter stages further comprises a charger coupled to the corresponding intermediate power battery module,
    the quick charging system further comprising:
    a series loop connecting the chargers in series, the series loop having a series arrangement formed of an inductor and a switch.

5. The quick charging system according to claim 1, wherein:
    m≥1;
    the arrangement of each converter stage comprises the corresponding intermediate power battery module, and for at least one of the converter stages, a charger coupled to the corresponding intermediate power battery module; and
    at least one of the energy internal storage stages further has a contactor module operationally coupled to the corresponding intermediate power battery module to selectively bypass, switch on and switch off the corresponding intermediate power battery module, and a charger coupled to the corresponding intermediate power battery module;
    the quick charging system further comprising:
    a series loop connecting the chargers in series, the series loop having a series arrangement formed of an inductor and a switch; and
    a series arrangement formed of an inductor and a switch connected between one of the terminals and one of the stages.

6. The quick charging system according to claim 1, wherein:
    m=0; and
    the arrangement of each converter stage comprises the corresponding intermediate power battery module, and for several ones of the converter stages, a charger coupled to the corresponding intermediate power battery module,
    the quick charging system further comprising:
    an inductor connected between one of the terminals and one of the stages; and
    a parallel bus connecting the chargers together.

7. The quick charging system according to claim 1, wherein:
    m≥1;
    the arrangement of each converter stage comprises the corresponding intermediate power battery module, and for at least one of the converter stages, a charger coupled to the corresponding intermediate power battery module; and
    at least one of the energy internal storage stages further has a charger coupled to the corresponding intermediate power battery module,
    the quick charging system further comprising:
    an inductor connected between one of the terminals and one of the stages; and
    a parallel bus connecting the chargers together.

8. The quick charging system according to claim 1, wherein:

$m \geq 1$;

the arrangement of at least one of the converter stages comprises the connection to the electrical supply source; and at least one of the energy internal storage stages further has a charger coupled to the corresponding intermediate power battery module, the charger connecting to the electrical supply source.

9. The quick charging system according to claim 1, wherein:

the power converter of each converter stage comprises a voltage source converter.

10. The quick charging system according to claim 8, wherein:

the arrangement of at least one of the converter stages comprises the corresponding intermediate power battery module and the connection to the electrical supply source, in addition to a charger coupled between the corresponding intermediate power battery module and the connection to the electrical supply source.

11. The quick charging system according to claim 10, further comprising:

a series loop formed of a series arrangement comprising at least a switch and an inductor coupling to the connection to the electrical supply source and connecting the chargers in series;

a series loop formed of a series arrangement comprising at least a switch and the inductor coupling to the terminals and connecting in series the power converter of each converter stage and the intermediate power battery module of each energy internal storage stage; and when $m \geq 2$, between at least two of the energy internal storage stages that follows one another, a switch connected between the corresponding intermediate power battery modules.

12. The quick charging system according to claim 10, wherein:

at least one of the energy internal storage stages further has a contactor module operatively coupled to the corresponding intermediate power battery module to selectively bypass, switch on and switch off the corresponding intermediate power battery module, the quick charging system further comprising:

a series loop formed of a series arrangement comprising at least a switch and the inductor coupling to the connection to the electrical supply source and connecting the chargers in series; and a series loop formed of a series arrangement comprising at least a switch and an inductor coupling to the terminals and connecting in series the power converter of each converter stage and the intermediate power battery module of each energy internal storage stage via the corresponding contactor module when applicable.

13. The quick charging system according to claim 8, wherein:

several of the energy internal storage stages comprise chargers coupled to the corresponding intermediate power battery modules; and the control unit has an operating mode separately modulating a charging power of each charger of the energy internal storage stages.

14. The quick charging system according to claim 8, wherein:

the electrical supply source derives from an electrical network;

$m \geq 2$; and the control unit has an operating mode managing each charger of the energy internal storage stages in order to follow a current setting of the electrical network.

15. The quick charging system according to claim 14, wherein the control unit comprises a controller determining a current to flow, a current controller producing a voltage target based on the current to flow, a discretization module for discretizing the voltage target, and a selection module for selecting the energy internal storage stages to be put into contribution to transfer energy between the electrical network and the intermediate power battery modules according to a discretization of the voltage target provided by the discretization module.

16. The quick charging system according to claim 8, wherein the electrical power device comprises a power battery connecting to the terminals and characterized by a high no-load voltage with respect to voltage drops caused by internal impedances of the power battery.

17. The quick charging system according to claim 1, wherein:

at least one of the converter stages comprises a contactor module operatively connected to selectively bypass, switch on and switch off the corresponding power converter.

18. The quick charging system according to claim 1, wherein:

$n \geq 2$;

$n+m \geq 4$; and the converter stages and the energy internal storage stages when applicable are distributed in order to form groups connected in parallel or in series and operatively connected between arrangements comprising inductors and switches selectively operable to select the groups of stages in condition to exchange energy with the electrical power device.

19. The quick charging system according to claim 1, wherein each intermediate power battery module comprises an arrangement of elementary cells coupled to flyback converters connected to a common bus, the flyback converters being operated by a controller in order to maintain a voltage on the common bus and carry out a balancing between the elementary cells by energy transfer with the common bus.

* * * * *